B. FURST & P. OETTINGER.

Nut-Locks.

No. 134,426.  Patented Dec. 31, 1872.

Witnesses:  
Chas. Nida  
E. Sedgwick

Inventor:  
B. Furst  
P. Oettinger  
per  
Munn & Co.  
Attorneys.

UNITED STATES PATENT OFFICE.

BERNHARD FÜRST AND PETER OETTINGER, OF LACON, ILLINOIS.

IMPROVEMENT IN NUT-LOCKS.

Specification forming part of Letters Patent No. 134,426, dated December 31, 1872.

*To all whom it may concern:*

Figure 1:
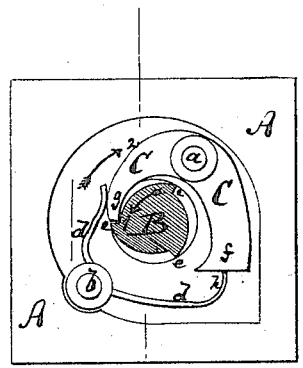
Figure 2:
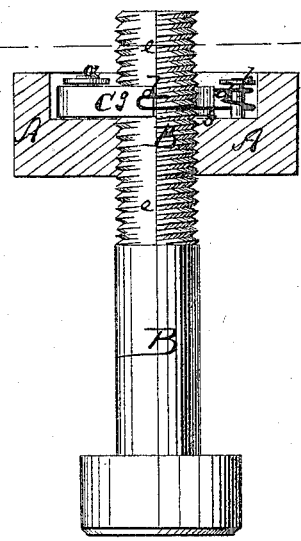

Be it known that we, BERNHARD FÜRST and PETER OETTINGER, of Lacon, in the county of Marshall and State of Illinois, have invented a new and Improved Nut-Lock, of which the following is a specification:

Figure 1 is a top or plan view of our improved nut-lock. Fig. 2 is a vertical sectional view of the same.

Similar letters of reference indicate corresponding parts.

This invention relates to a new nut-lock in which a spring-dog fits into a recess or chamber of the nut to bite against vertical grooves or creases in the screw.

A in the drawing represents the nut, and B the screw, both of which are to be connected. The nut has a recess or depression formed in its outer face, and within this recess is pivoted, by a pin, $a$, a dog or catch, C. To the face of the nut, within this recess, is also secured, by a rivet or pin, $b$, a spring, $d$, which bears against the dog and holds the end $g$ of said dog in contact with the screw. The screw is grooved longitudinally at two or more places, or rather creased, to form shoulders $e\ e$. As the screw is turned into the nut in the direction of the arrow 1, Fig. 1, or the nut turned onto the screw in the direction of the arrow 2, Fig. 1, the dog passes like a click over the several shoulders $e\ e$; but when either the screw or the nut is to be unscrewed in the direction opposite to the said arrows, respectively, the click, bearing against one of the shoulders $e$, prevents such unscrewing. The nut-lock is, therefore, perfect in operation.

Whenever the lock is to be opened it is only necessary to crowd the heel $f$ of the dog toward the screw, thereby raising its point $g$ clear off the shoulder $e$. To facilitate this motion the dog is made horseshoe-shape, as shown.

The spring $d$ is double. One end bears against the point $g$ of the dog and holds it against the screw. The other end forms a hook, $h$, in contact with the heel $f$ of the dog, and without effect except when the heel is swung toward the screw for unlocking, as above stated, in which case the hook $h$ springs over the outer face of the heel of the dog and locks it, thus holding the point $f$ away from the screw and allowing the free turning in either direction of nut as well as screw.

Having thus described our invention, we claim as new and desire to secure by Letters Patent—

1. The combination of the horseshoe-shaped dog C and spring $d$ with the recessed nut A and grooved screw B, all arranged to operate as described.

2. The spring $d$ made with the hook $h$ so that it will lock the dog and hold it off the screw, as set forth.

BERNHARD FÜRST.
PETER OETTINGER.

Witnesses:
MARTIN SCHERFF,
MICHAEL KRAKER.